United States Patent
Bauer et al.

(10) Patent No.: US 7,189,772 B2
(45) Date of Patent: *Mar. 13, 2007

(54) POLYURETHANE THICKENERS FOR AQUEOUS SYSTEMS

(75) Inventors: Sandra Bauer, Duisburg (DE); Eberhard Esselborn, Essen (DE); Stefan Silber, Krefeld (DE)

(73) Assignee: Goldschmidt GmbH, Essen (DE)

(*) Notice: Subject to any disclaimer, the term of this patent is extended or adjusted under 35 U.S.C. 154(b) by 108 days.

This patent is subject to a terminal disclaimer.

(21) Appl. No.: 10/670,808

(22) Filed: Sep. 25, 2003

(65) Prior Publication Data

US 2004/0060473 A1 Apr. 1, 2004

(30) Foreign Application Priority Data

Sep. 27, 2002 (DE) ............................... 102 45 099

(51) Int. Cl.
*C08J 3/00* (2006.01)
*C08K 5/06* (2006.01)
*C08L 75/00* (2006.01)
*C09J 7/02* (2006.01)
*C09D 5/00* (2006.01)

(52) U.S. Cl. ............ 524/366; 106/31.01; 106/31.13; 106/31.57; 106/31.58; 106/31.59; 523/160; 523/161; 524/591; 524/839; 524/840

(58) Field of Classification Search ............ 524/591, 524/839, 840, 366; 523/160, 161; 106/31.01, 106/31.13, 31.57, 31.58, 31.59
See application file for complete search history.

(56) References Cited

U.S. PATENT DOCUMENTS

| 4,079,028 | A | 3/1978 | Emmons et al. |
|---|---|---|---|
| 4,155,892 | A | 5/1979 | Emmons et al. |
| 4,327,008 | A | 4/1982 | Schimmel et al. |
| 4,426,485 | A | 1/1984 | Hoy et al. |
| 4,499,233 | A | 2/1985 | Tetenbaum et al. |
| 5,023,309 | A | 6/1991 | Kruse et al. |
| 5,597,406 | A | 1/1997 | Fischer et al. |
| 6,552,091 | B1* | 4/2003 | Boinowitz et al. ............ 516/30 |
| 6,861,493 | B2* | 3/2005 | Bauer et al. ................ 528/49 |

FOREIGN PATENT DOCUMENTS

| DE | 41 01 239 C1 | 4/1992 |
|---|---|---|
| DE | 196 00 467 A1 | 7/1997 |
| DE | 196 44 933 A1 | 4/1998 |
| EP | 0 031 777 A1 | 7/1981 |
| EP | 0 307 775 A2 | 3/1989 |
| EP | 0 495 373 A2 | 7/1992 |
| EP | 0 618 243 A2 | 10/1994 |

* cited by examiner

*Primary Examiner*—Patrick D. Niland
(74) *Attorney, Agent, or Firm*—Frommer Lawrence & Haug

(57) ABSTRACT

The invention provides for thickeners for inks and coating materials, comprising polyurethanes, water, viscosity regulators, and, if desired, organic solvents, wherein said viscosity regulators comprise compounds of the general formula (I)

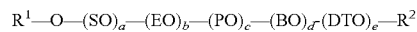

in which
$R^1$ and $R^2$ independently of one another are one of the radicals from the group consisting of hydrogen, an aliphatic or cycloaliphatic hydrocarbon radical which optionally is substituted and/or contains multiple bonds and/or contains heteroatoms, an aromatic radical which optionally is substituted and/or contains heteroatoms, an acyl radical, a carboxyacyl radical, and a carboxyalkyl radical,
$a=1$ to 5,
$b=3$ to 30,
$c=0$ to 5,
$d=0$ to 5, and
$e=0$ to 5
where $(a+c+d+e)<=b$.

9 Claims, No Drawings

POLYURETHANE THICKENERS FOR AQUEOUS SYSTEMS

RELATED APPLICATIONS

This application claims priority to German Application Serial No. 102 45 099.4, filed Sep. 27, 2002, herein incorporated by reference.

BACKGROUND OF THE INVENTION

1. Field of the Invention

The invention relates to a novel formulation of thickeners, based in particular on polyurethane, for thickening aqueous preparations for, for example, coating systems.

2. Description of the Related Art

A multiplicity of polyurethane-based associative thickeners is known. They are linear or branched, generally non-ionic surfactants having discrete hydrophilic and hydrophobic domains. Their typical structures, their preparation and use are described inter alia in U.S. Pat. No. 4,155,892 or U.S. Pat. No. 4,079,028.

The polyurethane thickeners are prepared from
(a) at least one water-soluble polyetherpolyol,
(b) at least one water-insoluble organic polyisocyanate,
(c) at least one monofunctional hydrophobic organic compound selected from compounds having a hydrogen atom which is active toward isocyanates and from organic monoisocyanates, and
(d) at least one polyfunctional alcohol or polyfunctional ether alcohol.

EP-A-307 775 describes water-dispersible, modified polyurethane thickeners which are prepared from
(a) a polyisocyanate,
(b) a polyetherpolyol,
(c) a modifier having at least 2 active hydrogen atoms and at least one hydrophobic group, said modifier containing no groups which can react with polyisocyanate or with the polyetherpolyol, and
(d) an endcapper, such as alkoxylated alcohols, for example.

U.S. Pat. No. 4,327,008 describes star-shaped PU thickeners which are reaction products of
(a) polyetherdiols,
(b) higher polyfunctional (>=3) polyetherpolyols or isocyanates,
(c) a diisocyanate,
(d) based on the polyetherdiol, from 37 to 175 mol percent of water, and
(e) an endcapping monool or monoisocyanate.

Further polyurethane thickeners are described in EP-A-0 31 777, EP-A-495 373, U.S. Pat. No. 4,499,233, U.S. Pat. No. 4,426,485, DE-A-4 101 239, and U.S. Pat. No. 5,023, 309.

Polyurethane thickeners of the type stated and their preparations are suitable auxiliaries for adjusting rheological properties of aqueous coating systems such as automotive finishes and industrial coatings, plasters and masonry paints, printing inks, pigment pastes, filler dispersions or cosmetic preparations: U.S. Pat. No. 4,155,892, U.S. Pat. No. 4,079, 028, EP-A-0 307 775, U.S. Pat. No. 4,327,008, EP-A-0 031 777, EP-A-0 495 373, U.S. Pat. No. 4,499,233, U.S. Pat. No. 4,426,485, DE-A-41 01 239, and U.S. Pat. No. 5,023,309.

All of these polyurethanes described in these prior publications, which are herein incorporated by reference, share the feature that hydrophilic segments are present in an amount of at least 50% by weight, with not more than 10% by weight of hydrophobic segments and urethane groups. Hydrophilic segments here are, in particular, high molecular mass polyether chains, composed in particular of ethylene oxide polymers. Hydrophobic segments are, in particular, hydrocarbon chains with at least six carbon atoms.

The skilled worker is aware that effective thickeners can only be obtained if the hydrophilic polyether segments have a molecular weight of at least 6,000 g/mol, are composed almost exclusively of polyethylene oxide, the hydrophobic segments have at least 12 carbon atoms, and hydrophilic and hydrophobic segments are in a balanced weight ratio of 92-97% to 8-3%.

In addition, these polyurethanes ought to have a very low inherent viscosity in order that, where appropriate in the form of very highly concentrated solutions, they can be processed and handled without problems. This requirement prevents, for example, the obvious preparation of long hydrophilic segments by chain-extending reaction of comparatively low molecular mass polyetherdiols with diisocyanates, since the greater number of urethane groups this entails would result in an unwanted increase in the inherent viscosity.

Recently a large number of experiments have been undertaken to lower the inherent viscosity of thickeners. The skilled worker is aware, however, that simply reducing molecular weight goes hand in hand with a deterioration in the thickener's effectiveness. Another possibility is based on the addition of typical emulsifier structures (DE-A-19 600 467), including in particular acetylenediol derivatives (EP-A-0 618 243). Also described is the additional admixing of diesters (DE-A-19 644 933). In U.S. Pat. No. 5,597,406 formulation is carried out using a diol or a diol monoalkyl ether, a salt of a sulfated nonylphenol ethoxylate, organic phosphoric esters, and nonionic surfactants.

These methods have the drawback to start with that these surfactants must be used at high concentrations in order to achieve a satisfactory reduction in the thickener's inherent viscosity. In addition they are accompanied by a range of further drawbacks, such as the stabilization of foam in the thickener preparations that is caused by these surfactants, and in particular aqueous systems in which they are present, such as dispersion-based masonry paints, for example.

Moreover, this introduction of surfactant undesirably impairs the water stability and weathering stability of coating systems and also, in the case of masonry paints, their abrasion resistance.

The high-performance alkylphenol ethoxylates have come under criticism on ecotoxicological grounds and their use is already legislatively regulated.

A further common method, known from the literature, of reducing the inherent viscosity of aqueous polyurethane solutions is to add water-soluble or water-miscible solvents such as alcohols or glycol derivatives, for example. The critical drawback of this approach, however, is that it involves the introduction of solvents into environmentally compatible coating systems to an undesirable extent, running counter to the concept of VOC reduction.

It is known that the problems depicted occur to an increased extent in connection with branched polyurethane thickeners of extreme pseudoplasticity.

Applications of styrene oxide block copolymers are still largely unknown in the printing inks and coatings industries. Known examples include (DE-A-19 806 964) polystyrene oxide-(block)-polyalkylene oxide copolymers, which, starting from a monofunctional starter alcohol, are reacted by sequential addition reaction of at least 2 mol of styrene oxide and an alkylene oxide, with subsequent phosphorylation to form the corresponding phosphoric esters.

These block copolymers are used particularly in their neutralized form, as the sodium or potassium salt, for example, as dispersants. Because of the electrolyte content and the high hygroscopicity, however, it is inappropriate to use them in larger amounts to formulate inks and paints. Where these compounds enter the environment, their lack of rapid biodegradability, a consequence of the relatively long styrene oxide blocks present, is a drawback.

OBJECTS OF THE INVENTION

It is an object of the present invention, therefore, to provide new formulating auxiliaries for polyurethane thickeners and low-foam, VOC-free (free from volatile organic compounds) preparations prepared from them which are easy to handle and to meter, have a low inherent viscosity in combination with, in some cases, an extreme thickening effect, and, in particular, do not adversely affect end coating properties such as abrasion resistances and weathering stabilities.

This object and others are surprisingly achieved in accordance with the invention by the accompanying use of a viscosity regulator of the general formula (I)

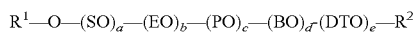

in which
R$^1$ and R$^2$ independently of one another are one of the radicals from the group consisting of hydrogen, an aliphatic or cycloaliphatic hydrocarbon radical which optionally is substituted and/or contains multiple bonds and/or contains heteroatoms, an aromatic radical which optionally is substituted and/or contains heteroatoms, an acyl radical, a carboxyacyl radical, and a carboxyalkyl radical,
SO=styrene oxide radical,
EO=ethylene oxide radical,
PO=propylene oxide radical,
BO=butylene oxide radical, and
DTO=dodecene oxide/tetradecene oxide (individually or as a mixture),
a=1 to 5,
b=3 to 30,
c=0 to 5,
d=0 to 5,
e=0 to 5
where
(a+c+d+e)<=b.

These objects and others are apparent from the following description of the inventions.

SUMMARY OF THE INVENTION

The invention accordingly provides thickeners for inks and coating materials, comprising polyurethanes, water, viscosity regulators, and, if desired, organic solvents, wherein said viscosity regulators comprise compounds of the general formula (I)

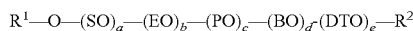

in which
R$^1$ and R$^2$ independently of one another are one of the radicals from the group consisting of hydrogen, an aliphatic or cycloaliphatic hydrocarbon radical which optionally is substituted and/or contains multiple bonds and/or contains heteroatoms, an aromatic radical which optionally is substituted and/or contains heteroatoms, an acyl radical, a carboxyacyl radical, and a carboxyalkyl radical,
SO=styrene oxide radical,
EO=ethylene oxide radical,
PO=propylene oxide radical,
BO=butylene oxide radical, and
DTO=dodecene oxide and/or tetradecene oxide (as the individual substance or as a mixture),
a=1 to 5,
b=3 to 30,
c=0 to 5,
d=0 to 5,
e=0 to 5
where
(a+c+d+e)<=b.

The invention further provides preparations for thickening aqueous systems, composed of a mixture of
(a) from about 10 to about 80 parts by weight of a polyurethane-based thickener,
(b) from 0 to about 80 parts by weight of water such that the sum of (a)+(b)+(c)+(d)=100,
(c) from 0 to about 50 parts by weight of cosolvent(s), and
(d) from about 5 to about 80 parts by weight of a viscosity regulator of the general formula (I)

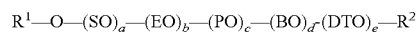

in which
R$^1$ and R$^2$ independently of one another are one of the radicals from the group consisting of hydrogen, an aliphatic or cycloaliphatic hydrocarbon radical which optionally is substituted and/or contains multiple bonds and/or contains heteroatoms, an aromatic radical which optionally is substituted and/or contains heteroatoms, an acyl radical, a carboxyacyl radical, and a carboxyalkyl radical,
SO=styrene oxide radical,
EO=ethylene oxide radical,
PO=propylene oxide radical,
BO=butylene oxide radical, and
DTO=dodecene oxide/tetradecene oxide (individually or as a mixture),
a=1 to 5,
b=3to 30,
c=0 to 5,
d=0 to 5,
e=0 to 5
where
(a+c+d+e)<=b.

The thickeners which can be used in accordance with the invention as an accompaniment are hydrophobically modified polyethylene-based polyurethanes. They are linear or branched, generally nonionic surfactants having discrete hydrophilic and hydrophobic domains. Their typical structures, their preparation, and use are described, inter alia, in U.S. Pat. No. 4,155,892, U.S. Pat. No. 4,079,028, EP-A-0 307 775, U.S. Pat. No. 4,327,008, EP-A-0 031 777, EP-A-0 495 373, U.S. Pat. No. 4,499,233, U.S. Pat. No. 4,426,485, DE-A-41 01 239, and U.S. Pat. No. 5,023,309. The publications are herein incorporated by reference.

An essential inventive feature of these viscosity regulators is their styrene oxide content. These polyethers are present in turn in the form of a mixture in a distribution which is governed essentially by laws of statistics. The various alkylene oxide monomers can be arranged randomly or in blocks, preference being given to the blockwise arrangement and in particular to that in which the styrene oxide is polymerized directly onto the starter alcohol R"OH. These emulsifiers drastically lower the inherent viscosity with increasing styrene oxide content.

Particular preference is given to a viscosity regulator having a nonylphenol-like structure, consisting of the starter alcohol isononanol which has been alkoxylated with 1.2 mol of styrene oxide and 10 mol of ethylene oxide.

The preparations of the invention can be prepared in a conventional manner. For example, component (d) can be added with stirring to the polyurethane thickener (a), with subsequent stirred incorporation of the water. Observing this sequence makes use at the same time of the highly diluting effect of the novel compound; were the water to be added first, the resultant viscosity would be undesirably high, necessitating in many cases time-consuming further processing. Ideally these steps take place immediately after the preparation of the polyurethane thickener.

| Compound | $R^1$ | $R^2$ | a | b | c | d | e | M g/mol |
|---|---|---|---|---|---|---|---|---|
| A1 | 3,5,5-Tri-methylhexanyl | H | 1 | 5 | 0 | 0 | 0 | 435 |
| A2 | 3,5,5-Tri-methylhexanyl | H | 1.2 | 10 | 0 | 0 | 0 | 670 |
| A3 | 1-Nonanyl | H | 1 | 9 | 0 | 0 | 0 | 635 |
| A4 | 1-Decanyl | H | 1 | 9 | 0 | 3 | 0 | 845 |
| A5 | 1-Dodecanyl | H | 1.9 | 12 | 3 | 0 | 0 | 860 |
| A6 | 2-Ethylhexyl | H | 1 | 9 | 3 | 0 | 0 | 790 |
| A7 | 3,5,5-Tri-methylhexanyl | H | 3 | 12 | 1 | 0 | 0 | 990 |
| A8 | Butyl | H | 1.2 | 10 | 0 | 0 | 0 | 620 |
| A9 | Methyl | H | 1.2 | 10 | 0 | 0 | 1 | 780 |
| A10 | Butyl | CO—CH$_3$ | 2 | 14 | 1 | 3 | 0 | 1150 |
| A11 | 3,5,5-Tri-methylhexanyl | CO—C$_2$H$_4$—COOH | 1.5 | 8 | 0 | 0 | 0 | 720 |
| A12 | 3,5,5-Tri-methylhexanyl | CH$_2$COOH | 3 | 30 | 4 | 0 | 0 | 1700 |

WORKING EXAMPLES

The following non-limiting examples illustrate the invention.

Synthesis of the Polyalkylene Oxide 3,364 g (23.4 mol) of trimethylhexanol and 163 g (2.3 mol) of potassium methoxide were charged to a reactor. After careful inertization with pure nitrogen this initial charge was heated to 110° C. and 3,082 g (25.4 mol) of styrene oxide were added over the course of an hour. After a further two hours the addition reaction of the styrene oxide was at an end, detectable from the fact that the residual styrene oxide content according to GC was <0.1% by weight. Thereafter 3,392 g (77.1 mol) of ethylene oxide were metered into the reactor at a rate such that the internal temperature did not exceed 120° C. and the pressure did not exceed 6 bar. After all of the ethylene oxide had been introduced the temperature was held at 115° C. until a constant manometer pressure indicated the end of the subsequent reaction. Finally, at from 80 to 90° C., the residual, unreacted monomers were removed in vacuo. The product obtained was neutralized using phosphoric acid and the water was removed by distillation, the potassium phosphate formed being removed by filtration together with a filter aid. The molecular weight obtained from the determination of the hydroxyl number, at an assumed functionality of 1, was M=467 g/mol.

The skilled worker is aware that the sequence of alkoxylation is arbitrary. Where, for example, alkoxylation takes place first with the lower epoxides such as ethylene oxide, propylene oxide or butylene oxide and only lastly with the styrene oxide, the radical $R^1$ is a hydrogen. Owing to the high reactivity of the lower epoxides and the lower reactivity of the higher epoxides, the route generally adopted in the art is first to add the epoxides having the lower reactivity onto the starter molecule. In special cases, however, it may be necessary to add on the styrene oxide and the higher alkylene oxides at the end and to exploit the particular physicochemical properties of the free OH group.

In a similar way, using processes in accordance with the prior art, the compounds A2 to A12 of the invention, intended for use in accordance with the invention, were prepared.

Synthesis of Polyurethanes

Polyurethane B1

Raw Materials:

1.05 mol of Desmodur® N, 22.0% NCO, molecular weight=572 g/mol, 97 eq % of a polyether prepared starting from lauryl alcohol, alkoxylated with 2 mol of SO and 100 mol of EO; MW act. to OHN=4,600 g/mol, 1 eq % of a polyether starting from butanediol, alkoxylated with 5 mol of EO and 5 mol of BO; MW at. to OHN=638 g/mol, and 2 eq % of the polyethersiloxane "Tego® Foamex 840"; MW act. to OHN=5,220 g/mol.

Procedure:

97 eq %, corresponding to 4,462 g, of the polyether, prepared starting from lauryl alcohol with the molecular weight 4,600 g/mol (the molecular weights are calculated from the OH number), 1 eq %, corresponding to 3.2 g, of the polypropylene-butylene glycol, prepared starting from butanediol with a molecular weight of 638 g/mol, and 2 eq %, corresponding to 52 g, of the polyethersiloxane "Tego Foamex 840" with a molecular weight of 5,200 g/mol are charged under $N_2$ to the dry reactor. For dewatering of the polyether mixture the products are heated to 110° C. in the reaction vessel and dewatered under reduced pressure (<15 mm) and under a gentle stream of nitrogen for 1 h; the water content (by the Karl Fischer method) should be <0.03%. If the water content is higher, the dewatering time is extended accordingly. After the drying operation, the batch is cooled to 80° C. Then 600 g of Desmodur N, corresponding to 1.05 mol, i.e., having an NCO index of 1.05, are added to the liquid reaction mixture.

First of all the Desmodur N is intimately mixed with the OH-functional components. Then 5 g of dibutyltin dilaurate are added; at this point there is a slight exothermic reaction, the increase in temperature amounting to approximately 10° C. The viscosity rises markedly over time. After 6 hours the NCO content is determined as a way of monitoring the reaction. At an NCO level of <0.01% the reaction is very largely at an end.

The product is a solid but frangible wax. In ground form it has a pale color and can be stored without sintering together.

Polyurethane B2

100 eq %, corresponding to 3,400 g, of the polyether prepared starting from stearyl alcohol (alkoxylated with 3 mol of BO and 80 mol of EO) with the molecular weight 3,400 g/mol (the molecular weights are calculated from the OH number), are charged under $N_2$ to the dry reactor. For dewatering of the polyether the products are heated to 110° C. in the reaction vessel and dewatered under reduced pressure (<15 mm) and under a gentle stream of nitrogen for 1 h; the water content (by the Karl Fischer method) should be <0.03%. If the water content is higher, the dewatering time is extended accordingly. After the drying operation, the batch is cooled to 80° C. Then 600 g of Desmodur N, corresponding to 1.05 mol, i.e., having an NCO index of 1.05, are added to the liquid reaction mixture. First of all the Desmodur N is intimately mixed with the OH-functional components. Then 4 g of dibutyltin dilaurate are added; at this point there is a slight exothermic reaction, the increase in temperature amounting to approximately 10° C. The reaction mixture is still very liquid.

After 6 hours the NCO content is determined as a way of monitoring the reaction. At an NCO level of <0.01% the reaction is very largely at an end.

The product is a solid but frangible wax at room temperature. In ground form it has a pale color and can be stored without sintering together.

Similarly, using processes in accordance with the prior art, the following compounds are prepared.

Polyurethane B3

From 1.05 mol of Desmodur N, 96 eq % of a polyether prepared starting from stearyl alcohol, corresponding to 4,320 g, alkoxylated with 100 ml of EO; MW act. to OHN 4,500 g/mol; 2 eq % of a polyether prepared starting from propylene glycol, corresponding to 8.3 g, alkoxylated with 5 mol of EO and 5 mol of SO; MW act. to OHN 830 g/mol.

2 eq % of the polysiloxanediol "Tego Glide 440", corresponding to 29.0 g, with a molecular weight of 2,900 g/mol. Preparation is carried out as described in Example B 1. The additional diols here, i.e., the polypropylene glycol and the polysiloxanediol "Tego Glide 440", are likewise added to the batch prior to the polyether drying operation, in order to avoid any unwanted chance contamination with water.

The reaction product after cooling is a solid but frangible wax.

Polyurethane B4

180 g of a polyethylene glycol having a molecular weight of 6,000 g/mol (0.03 mol), are charged under $N_2$ to the dry reactor. For dewatering of the polyether the product is heated to 110° C. in the reaction vessel and dewatered under reduced pressure (<15 mm) and under a gentle stream of nitrogen for 1 h; the water content (by the Karl Fischer method) should be <0.03%. If the water content is higher, the dewatering time is extended accordingly. After the drying operation, the batch is cooled to 80° C. Then 4.66 g of Vestanat® IPDI (isophorone diisocyanate) i.e., having an NCO index of 1.05 and 5.9 g of stearyl isocyanate, are added to the liquid reaction mixture. First of all the isocyanates are intimately mixed with the OH-functional components. Then 4 g of dibutyltin dilaurate are added; at this point there is a slight exothermic reaction, the increase in temperature amounting to approximately 10° C. The reaction mixture is still very liquid. After 6 hours the NCO content is determined as a way of monitoring the reaction. At an NCO level of <0.01% the reaction is very largely at an end.

The product is a solid but frangible wax at room temperature. In ground form it has a pale color and can be stored without sintering together.

Polyurethane B5

160 g, corresponding to 0.02 mol, of the polyether, prepared starting from a diol, having a molecular weight of 8,000 g/mol (the molecular weights are calculated from the OH number), and 48 g, corresponding to 0.02 mol, of a stearyl alcohol alkoxylated with 50 mol of ethylene oxide are charged under $N_2$ to the dry reactor. For dewatering of the polyether it is heated to 110° C. in the reaction vessel and dewatered under reduced pressure (<15 mm) and under a gentle stream of nitrogen for 1 h; the water content (by the Karl Fischer method) should be <0.03%. If the water content is higher, the dewatering time is extended accordingly. After the drying operation, the batch is cooled to 80° C. Then 8.1 g of Desmodur® W (dicyclohexylmethane diisocyanate, from Bayer), corresponding to an NCO index of 1.05, are added to the liquid reaction mixture. First of all the Desmodur is intimately mixed with the OH-functional components. Then 4 g of dibutyltin dilaurate are added; at this point there is a slight exothermic reaction, the increase in temperature amounting to approximately 10° C. The reaction mixture is still very liquid. After 6 hours the NCO content is determined as a way of monitoring the reaction. At an NCO level of <0.01% the reaction is very largely at an end. The product is a solid but frangible wax at room temperature. In ground form it has a pale color and can be stored without sintering together.

Polyurethane B6

180 g of polyethylene glycol having a molecular weight of 6,000 g/mol are reacted with 3.72 of lauryl alcohol and 7.32 g of tolylene diisocyanate in the manner described in Example B4 to give a polyurethane but with the difference that the lauryl alcohol is dried separately in a known way and consequently is added to the batch only after the polyether drying operation and before the addition of the isocyanate. The product is a wax which is solid at room temperature but frangible. In the ground state it has a pale color and can be stored without sintering together.

Polyurethane B7

150 g of polyethylene glycol having a molecular weight of 3,000 g/mol are reacted with 3.72 of lauryl alcohol and 10.9 g of tolylene diisocyanate in the manner described in Example B5 to give a polyurethane. The product is a wax which is solid at room temperature but frangible. In the ground state it has a pale color and can be stored without sintering together.

Polyurethane B8

180 g of polyethylene glycol having a molecular weight of 6,000 g/mol are reacted with 3.16 of decyl alcohol and 9.3 g of isophorone diisocyanate in the manner described in Example B5 to give a polyurethane. The product is a wax which is solid at room temperature but frangible.

In the ground state it has a pale color and can be stored without sintering together.

Polyurethane B9

180 g of polyethylene glycol having a molecular weight of 6,000 g/mol are reacted with 5.46 g of stearyl alcohol and 7.1 g of hexamethylene diisocyanate in the manner described in Example B5 to give a polyurethane. The product is a wax which is solid at room temperature but frangible.

In the ground state it has a pale color and can be stored without sintering together.

Formulation of the Polyurethanes

Examples F1 to F15

The emulsifier from Examples A1 to A12 and, where appropriate, the cosolvent, propylene glycol, are added to the polyurethane, which is at a temperature of 80° C., with thorough mixing and the mixture is stirred until a homogeneous solution results. Thereafter the particular required amount of water is added.

The viscosities of the resultant solutions were measured in a Haake RV 12 viscometer using the SV DIN sensor at 23° C. and $10.3\ s^{-1}$ and are listed in the table below.

| Formulation | PU from Example | PU % | Emulsifier | Emulsifier % | Water % | Co-solvent % | Viscosity at 23° C. and 10.3 s$^{-1}$ |
|---|---|---|---|---|---|---|---|
| F1 | B1 | 25 | A1 | 25 | 50 | 0 | 5600 |
| F2 | B2 | 18 | A2 | 52 | 20 | 10 | 1200 |
| F3 | B3 | 15 | A3 | 40 | 25 | 20 | 3600 |
| F4 | B4 | 35 | A4 | 25 | 40 | 0 | 9500 |
| F5 | B5 | 30 | A5 | 30 | 40 | 0 | 8200 |
| F6 | B6 | 25 | A6 | 15 | 60 | 0 | 6700 |
| F7 | B7 | 28 | A7 | 22 | 50 | 0 | 7400 |
| F8 | B8 | 30 | A2 | 10 | 60 | 0 | 5700 |
| F9 | B9 | 20 | A4 | 40 | 30 | 0 | 2200 |
| F10 | B4 | 30 | A2 | 25 | 50 | 0 | 6400 |
| F11 | B6 | 25 | A8 | 20 | 55 | 0 | 5800 |
| F12 | B7 | 25 | A9 | 25 | 50 | 0 | 6200 |
| F13 | B8 | 30 | A10 | 15 | 55 | 0 | 5200 |
| F14 | B9 | 20 | A11 | 30 | 50 | 0 | 3100 |
| F15 | B6 | 20 | A12 | 20 | 60 | 0 | 7400 |

Without the use of the active substance of the invention the solutions are highly viscous and very turbid. The thickeners of Examples 1 to 3 are insoluble without the addition of the emulsifier of the invention, and lie as a partly swollen mass on the bottom of the vessel.

The following examples show that the thickening effect of the polyurethane component (a) is ultimately unaffected by the viscosity-lowering additive (d) in a masonry paint formula.

Performance Examples

Formulation of a Masonry Paint Based on "Acronal® 290 D"

| Product/Manufacturer | Mass in g |
|---|---|
| Water | 265.5 |
| Calgon® N[1] 10% in water (Benckiser GmbH) | 2.0 |
| Inventive formulation of the PU thickener, 35% concentration* | 8.5 |
| TEGO® Foamex 8030 (Degussa, Tego Coating and Ink Additives) [polyethersiloxane defoamer] | 1.0 |
| NaOH, 25% strength | 1.0 |
| Dispax® N 40 (Allied Colloids Ltd) [polyacrylate, dispersing aid] | 5.0 |
| Dowanol® PnB (Dow Chemical) [dipropylene glycol monobutyl ether, cosolvent] | 5.0 |
| Preventol® D6 (Bayer AG) [preservative] | 2.0 |
| Bayertitan RKB-5 (Bayer AG) [titanium dioxide] | 57.0 |
| Socal® P2 (Solvay Alkali GmbH) [filler] | 80.0 |
| Microtalc® AT 200 (Norwegian Talkum) [talc] | 91.0 |
| Omyalite® 90 (Plüss Staufer AG) [filler] | 125.0 |
| Omyacarb® 5 GU (Plüss Staufer AG) [filler] | 297.0 |
| Acronal® 290 D (BASF) Styrene-acrylate dispersion [binder] | 60 |
| total | 1000 |

*If concentration differs the amount of water is altered so that the total is always 1,000 g.

The masonry paint based on Acronal 290 D is formulated with the stated amount of thickener. After a resting time of one day the viscosity is measured. The results are shown in the table below. The measurement system consists of a Haake RV 12 viscometer with SV DIN sensor, temperature 23° C.

| Thickener formulation from Example | Viscosity 10.3 * sec$^{-1}$ mPas | Viscosity 100 * sec$^{-1}$ mPas | Viscosity 600 * sec$^{-1}$ mPas |
|---|---|---|---|
| F1 | 9800 | 3900 | 1900 |
| F2 | 8500 | 3000 | 1300 |
| F3 | 9200 | 3200 | 1320 |
| F4 | 6400 | 2600 | 1230 |
| F5 | 4600 | 2000 | 1040 |
| F6 | 4400 | 2050 | 1140 |
| F7 | 5100 | 2100 | 1060 |
| F8 | 2400 | 1330 | 890 |
| F9 | 7800 | 3000 | 1150 |
| F10 | 6500 | 2600 | 1250 |
| F11 | 3900 | 1760 | 820 |
| F12 | 5000 | 2050 | 830 |
| F13 | 2500 | 1390 | 920 |
| F14 | 7800 | 3000 | 1380 |
| F15 | 6500 | 2600 | 1250 |

Formulation of a Semigloss Masonry Paint Based on a "Rhoplex AC-347" Emulsion

| Product/Manufacturer | Mass in g |
|---|---|
| Propylene glycol (BASF) [Cosolvent] | 5.26 |
| Tamol® 165 (Rohm & Haas) [polyacrylate, dispersing aid] | 0.86 |
| TEGO® Foamex 805 (Degussa, Tego Coating and Ink Additives) [polyethersiloxane defoamer] | 0.10 |
| Kathon® LX 1,5% (Rohm & Haas) [biocide] | 0.17 |
| Ti-Pure® R 706 (Du Pont) [titanium dioxide] | 19.46 |
| Minex® TM 10 (Unimin) [filler] | 1.95 |
| Water | 1.01 |

| Product/Manufacturer | Mass in g |
| --- | --- |
| Ammonia solution, 28% strength | 0.19 |
| Water | 4.86 |
| Rhoplex ® AC-347 (Rohm & Haas) [binder, acrylate dispersion] | 42.88 |
| Rhopaque ® OP-96 (Rohm & Haas) [filler dispersion] | 4.16 |
| Texanol ® (Eastman Kodak) [solvent] | 2.12 |
| Triton ® GM-7M (Rohm & Haas) [wetting agent] | 0.15 |
| TEGO ® Foamex 805 (Degussa, Tego Coating and Ink Additives) [Polyether siloxane defoamer] | 0.29 |
| Inventive formulation of the PU thickener (35% concentration)* | 1.10 |
| Water | 13.36 |
| total | 100 |

*If the concentration is different the amount of water is altered so that the total is always 100 g.

This formulation is prepared in the manner familiar to the skilled worker: the components are mixed homogeneously in the order indicated in the table using a dispersing disk at 1,000 rpm over a period of 30 minutes. The masonry paint based on Rhoplex AC-347 (Rohm & Haas) is therefore modified, as described, with the stated amount of thickener. After a resting time of one day the viscosity of the resultant solutions is determined in accordance with the manufacturer's specifications in the Haake RV 12 viscometer with SV DIN sensor at 23° C. The results are set out in the table below:

| Thickener from Example | Viscosity 103 * sec$^{-1}$ mPas | Viscosity 100 * sec$^{-1}$ mPas | Viscosity 600 * sec$^{-1}$ mPas |
| --- | --- | --- | --- |
| F1 | 9500 | 3800 | 1800 |
| F2 | 8200 | 2900 | 1250 |
| F3 | 8900 | 3100 | 1300 |
| F4 | 6100 | 2500 | 1170 |
| F5 | 4400 | 1900 | 1000 |
| F6 | 4200 | 1950 | 1080 |
| F7 | 4900 | 2000 | 1020 |
| F8 | 2200 | 1220 | 810 |
| F9 | 7500 | 2900 | 1330 |
| F10 | 6300 | 2500 | 1220 |
| F11 | 3900 | 1760 | 820 |
| F12 | 5000 | 2050 | 830 |
| F13 | 2500 | 1390 | 920 |
| F14 | 7800 | 3000 | 1380 |
| F15 | 6500 | 2600 | 1250 |

What is claimed is:

1. A thickener comprising polyurethanes, water, at least one viscosity regulator, and, optionally, at least one organic solvent, wherein said viscosity regulator comprises at least one compound of the general formula (I)

$$R^1-O-(SO)_a-(EO)_b-(PO)_c-(BO)_d-(DTO)_e-R^2 \quad (I)$$

in which
  $R^1$ and $R^2$ independently of one another are one of the radicals selected from the group consisting of hydrogen, an aliphatic or cycloaliphatic hydrocarbon radical, which optionally contains multiple bonds and/or heteroatoms, an aromatic radical, which optionally contains heteroatoms, an acyl radical, a carboxyacyl radical, and a carboxyalkyl radical,
  SO=styrene oxide radical,
  EO=ethylene oxide radical,
  PO=propylene oxide radical,
  BO=butylene oxide radical, and
  DTO=dodecene oxide and/or tetradecene oxide (as the individual substance or as a mixture),
  a=1 to 5,
  b=3 to 30,
  c=0 to 5,
  d=0 to 5,
  e=0 to 5
  where
  (a+c+d+e)<=b.

2. The thickener as claimed in claim 1, wherein the viscosity regulators comprises at least one compound of the general formula (I) in which $R^1$ is a radical selected from the group consisting of hydrogen, an aliphatic or cycloaliphatic hydrocarbon radical, which optionally is substituted and optionally contains multiple bonds and/or contains heteroatoms, and an aromatic radical which optionally is substituted and optionally contains heteroatoms.

3. The thickener as claimed in claim 1, wherein the viscosity regulator comprises at least one compound of the general formula (I) in which $R^2$ is a radical selected from the group consisting of hydrogen, an aliphatic or cycloaliphatic hydrocarbon radical, which optionally is substituted and optionally contains multiple bonds and/or contains heteroatoms, an aromatic radical, which optionally is substituted and optionally contains heteroatoms, an acyl radical, a carboxyacyl radical, and a carboxyalkyl radical.

4. The thickener as claimed in claim 1, wherein said viscosity regulator comprises at least one compound of the general formula (I) in which $R^1$ is a radical selected from the group consisting of hydrogen, an aliphatic or cycloaliphatic hydrocarbon radical, which optionally is substituted and optionally contains multiple bonds and/or contains heteroatoms, and an aromatic radical, which optionally is substituted and optionally contains heteroatoms and $R^2$ is a radical selected from the group consisting of hydrogen, an aliphatic hydrocarbon radical, which optionally is substituted and optionally contains multiple bonds and/or contains heteroatoms, an acyl radical, a carboxyacyl radical, and a carboxyalkyl radical.

5. The thickener as claimed in claim 1, wherein said viscosity regulator comprises at least one compound of the general formula (I) in which $R^1$ is a radical selected from the group consisting of hydrogen, an aliphatic or cycloaliphatic hydrocarbon radical, which optionally is substituted and optionally contains multiple bonds and/or contains heteroatoms, and an aromatic radical, which optionally is substituted and optionally contains heteroatoms and $R^2$ is hydrogen.

6. A thickener comprising
  a) from about 10 to about 80 parts by weight of a polyurethane-based thickener,
  b) from 0 to about 80 parts by weight of water such that the sum of (a)+(b)+(c)+(d)=100,
  c) from 0 to about 50 parts by weight of an organic solvent, and
  d) from about 5 to about 80 parts by weight of a viscosity regulator of the general formula (I)

$$R^1-O-(SO)_a-(EO)_b-(PO)_c-(BO)_d-(DTO)_e-R^2$$

in which
  $R^1$ and $R^2$ independently of one another are one of the radicals from the group consisting of hydrogen, an aliphatic or cycloaliphatic hydrocarbon radical, which is optionally substituted and optionally contains multiple bonds and/or contains heteroatoms, an aromatic radical, which is optionally substituted and optionally contains heteroatoms, an acyl radical, a carboxyacyl radical, and a carboxyalkyl radical, SO=styrene oxide radical,
EO=ethylene oxide radical,
PO=propylene oxide radical,
BO=butylene oxide radical, and
DTO=dodecene oxide and/or tetradecene oxide (as the individual substance or as a mixture),
$a=1$ to 5,
$b=3$ to 30,
$c=0$ to 5,
$d=0$ to 5,
$e=0$ to 5
where
$(a+c+d+e)<=b$.

7. An ink which comprises a pigment and a thickener according to claim 1.

8. A paint which comprises a pigment and a thickener according to claim 1.

9. A coating composition which comprises a polyurethane thickener and a thickener according to claim 1.

* * * * *